United States Patent [19]

Arnoldy

[11] Patent Number: 4,613,741

[45] Date of Patent: Sep. 23, 1986

[54] FEEDER FOR WELDS

[76] Inventor: Roman F. Arnoldy, P.O. Box 40472, Houston, Tex. 77040

[21] Appl. No.: 657,434

[22] Filed: Oct. 3, 1984

[51] Int. Cl.[4] .............................................. B23K 9/18
[52] U.S. Cl. ................................. 219/73.2; 219/73.21
[58] Field of Search ...................... 219/73, 73.2, 73.21

[56] References Cited

U.S. PATENT DOCUMENTS

| | | | |
|---|---|---|---|
| 2,189,399 | 2/1940 | Lewberg | 219/73.2 X |
| 2,253,207 | 8/1941 | Hopkins | 219/73.2 |
| 3,060,307 | 10/1962 | Arnoldy | 219/73.2 |
| 3,172,991 | 3/1965 | Arnoldy | 219/73.2 |
| 3,358,115 | 12/1967 | Arnoldy | 219/73.21 |
| 3,513,288 | 5/1970 | Arnoldy | 219/137 |
| 3,517,156 | 6/1970 | Arnoldy | 219/76.14 |
| 3,936,655 | 2/1976 | Arnoldy | 219/73.21 X |

Primary Examiner—Clarence L. Albritton
Assistant Examiner—Catherine M. Sigda
Attorney, Agent, or Firm—Fulbright & Jaworski

[57] ABSTRACT

A feeder for feeding alloy materials and electrode wire to a weld zone for deposition in desired amounts including a plurality of independent feeding elements, each feeding element controlled by its own independent control, the feeding elements powered by motors which are independent of the motor used to feed the electrode wire to the weld zone.

5 Claims, 2 Drawing Figures

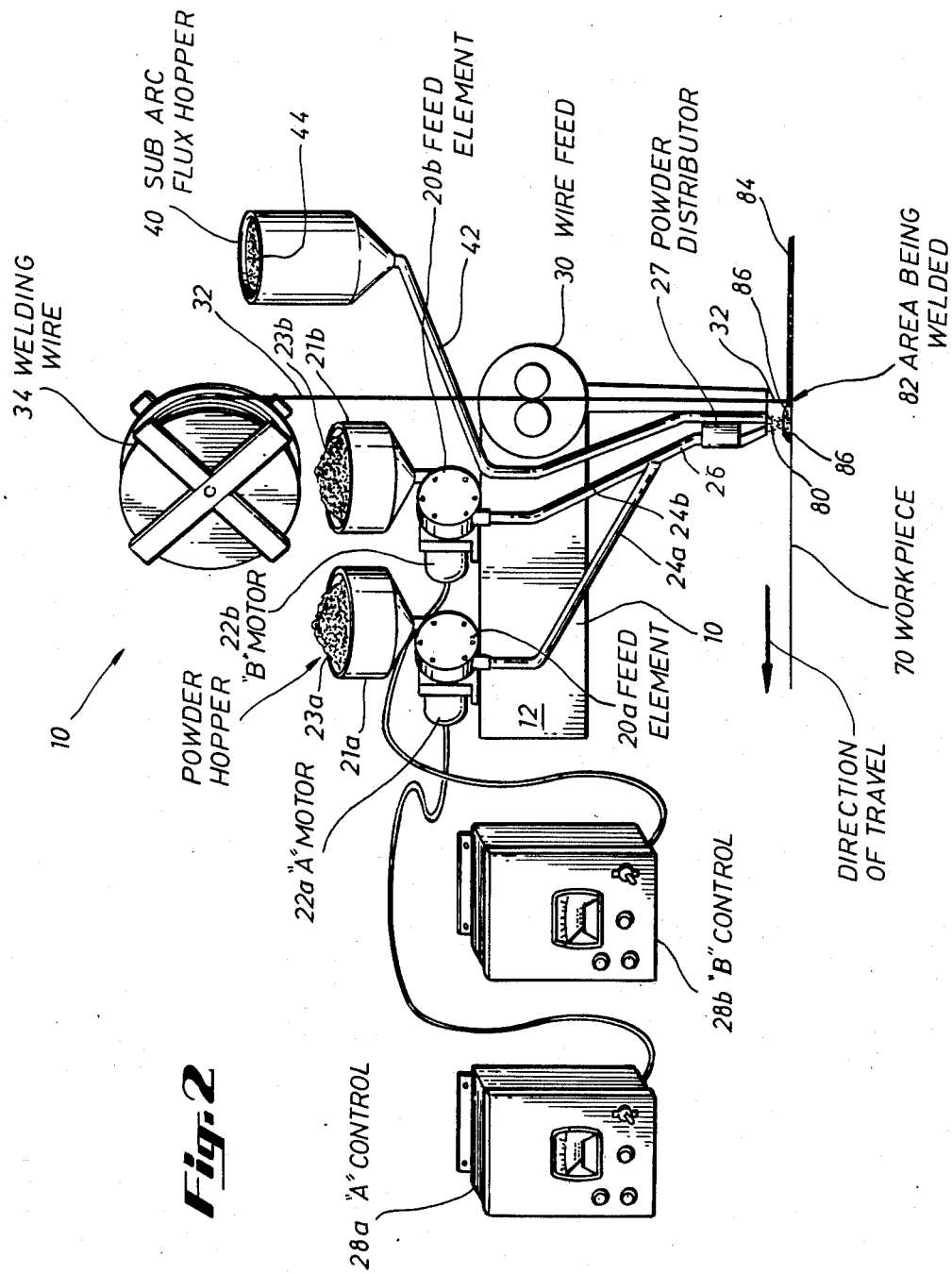

FEEDER FOR WELDS

BACKGROUND OF THE INVENTION

1. Field of the Invention

The present invention is directed to new and improved feeders for welding, cladding, overlaying and the like, and particularly apparatus wherein powdered alloy materials and an electrode wire for producing an alloy weld are fed and deposited in desired amounts on the area to be fusion welded or weld overlayed and the like which provides an alloy weld of a predetermined composition.

2. Description of the Prior Art

Due to the difficulty of providing homogeneous mixtures to the weld zone, a major problem in fusion welding or weld overlaying is the provision of alloy welds of uniform composition or analysis. For example, premixing of metals does not provide homogeneous mixtures to the work because the heavier metal particles settle out, the larger particles rise to the surface and the more angular particles rise to the top in storage, transportation or other movement. The same problem exists in premixing flux material with alloy metal or metals.

The provision of a feeder which feeds homogeneous mixtures of metal alloy materials to the work and by which a fusion weld or weld overlay is obtained of uniform composition or analysis and either in open arc, series arc, submerged or shielded welding has been highly desirable. It would also be desirable to simultaneously feed materials in desired amounts with the electrode so that accurate, predetermined, homogeneous mixtures and welds are obtained without any special or expensive processing or premixing of the various metals. It would be desirable to provide a feeder capable of feeding a variety of materials, even non-compatible materials, to the weld zone simultaneously, the driving means for the feeding of each such material being independent of the driving means for the feeding of the other materials and independently of the driving means for the electrode wire. Also, it would be very desirable to provide a feeder capable of changing the amounts of materials or ratios of the materials without having to stop the feeder and adjust or change parts.

My prior U.S. Pat. No. 3,172,991 is the closest art of which I am aware. It discloses a feeder for welds which utilizes a plurality of material feed wheels. All the wheels are mounted to connecting shafts which act as a unit and are driven by the electrode wire as the wire is fed through the machine. The speed of the wheels is a slave to and limited by the speed of the wire and, relatively speaking, there can be very little adjustment in the wire speed. This, in turn, severely limits the freedom of adjustment of the amounts of materials deposited in the weld zone. Also, the size of the feed wheel pockets severely limits the range of deposition rates. In order to significantly change deposition rate, the apparatus must be stopped, the old feed wheel removed, and a new feed wheel with different characteristics installed. This is a tedious and inefficient welding method.

SUMMARY OF THE INVENTION

The present invention is directed to a multiple feeder apparatus for welding which has a plurality of material feeding elements, each of which can be driven, operated and controlled independently of each other element and independently of a wire electrode feed. This is accomplished by utilizing separate motors for each feeding element each with independent electronic controls. By adjusting the motor speed using the electronic controls, the amount and rates of material deposition can be accurately and precisely controlled and changed as desired. The range of change possible with this arrangement is significantly broader than the range of change possible with prior art devices in which individual feed wheels are slaves to the wire electrode feed.

It is an object of the present invention to provide an improved feeder apparatus for open arc, series arc, submerged arc, or shielded welding by which a mixture of desired amounts of materials are fed to a weld zone simultaneously with the electrode.

Another object of the present invention is the provision of a feeder apparatus in which flux material is simultaneously fed along with the weld materials for submerged welding.

Still another object of the present invention is the provision of a feeder apparatus in which varying amounts of welding materials are fed simultaneously in homogeneous mixtures with the electrode wire feed, which is relatively easy to manufacture and repair and which is efficiently reliable in operation by which all types of alloy welding can be accomplished efficiently and in which the alloy weld deposited is of a controlled, desired, uniform composition.

An additional object of the present invention is the provision of such an improved feeder which co-ordinates automatically in a single feeding operation the mixing and the deposition of alloy materials, the deposition of shielding gas materials or flux materials, and a wire electrode to form a weld having a controlled, uniform analysis.

A particular object of the present invention is the provision of such a new and improved feeder in which the predetermined proportional amounts of particulate welding materials and gas shielding or flux material are fed with a wire electrode to the work by a feeding means driven independently of the feeding of the wire electrode.

Another particular object of the invention is the provision of a feeder in which several feeding elements can be easily and readily used for feeding a number of materials to the work simultaneously and in predetermined relationship, yet independently of one another.

Other and further objects, features and advantages of the present invention will be apparent from the following description of presently-preferred embodiments thereof, given for the purpose of disclosure, and taken in conjunction with the accompanying drawings.

DESCRIPTION OF THE DRAWINGS

FIG. 2 is a perspective view of the welding feeder apparatus according to the present invention.

DESCRIPTION OF PREFERRED EMBODIMENT

Figure 1:
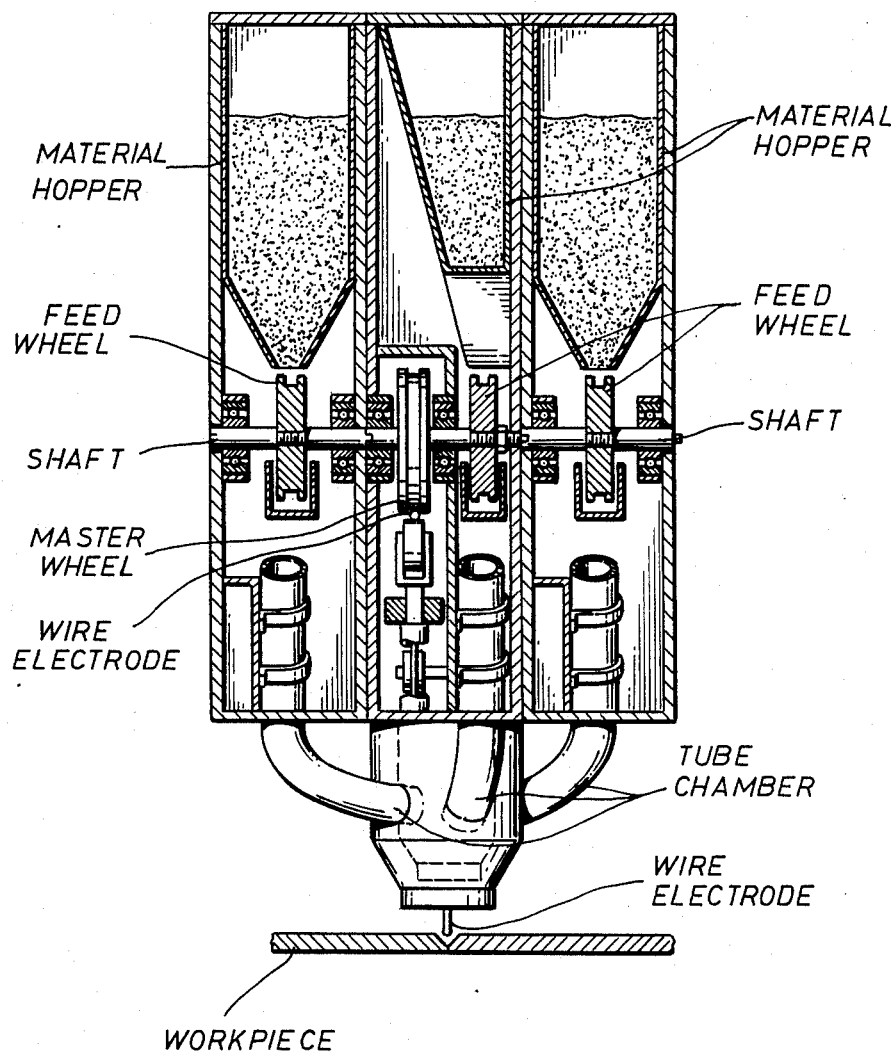
FIG. 1 is a sectional view of a prior art weld feeder device as disclosed in U.S. Pat. No. 3,172,991, illustrating the dependent relationship between the wire electrode feeding and guiding mechanism, the feed wheels, and the welding composition feeding mechanism thereof.

The multiple feeder of the present invention may be used in a variety of types of welding operations, including open arc, series arc, submerged arc, shielded welding, and in self-shielding welding in which one of the materials being worked with emits its own shielding gas or in which one of the materials being worked with emits material which combines with other materials to form a shielding gas. With the teachings of the present invention, the connection and positioning of the various pieces of apparatus and controls will be apparent to one of skill in the welding art as will be the electrical aspects of arc production, control and location.

Referring now to FIG. 1, in prior art apparatuses multiple material feed wheels are mounted on interconnecting shafts which when connected revolve as a single unit. A master wheel mounted on the resulting shaft is moved in response to the feeding of a wire electrode to the workpiece. The frictional contact of the moving wire electrode moves the master wheel, thereby moving the shaft and the feed wheels. The feed wheels revolve beneath material hoppers, the pockets in the feed wheels filling with material and then, upon rotation of the wheel, emptying their contents into their corresponding tube chambers for deposition on the workpiece in the weld zone.

In the prior art devices, the feed wheels' speed is limited by the speed of the feed of the wire electrode. If a substantially higher deposition rate of a particular material is desired, a rate which exceeds the rate possible with the fastest allowable wire electrode feeding mode, the apparatus must be stopped and a wheel with larger pockets or more pockets or both must be installed to accomplish the higher deposition rate. Also, all feed wheels in the prior art devices turn at the same speed due to the unitary nature of the inter-connected feed wheel shafts and their dependence on the wire electrode feeding speed.

Referring now to the preferred embodiment of the present invention as depicted in FIG. 2, the welding apparatus 10 has a body member 12 on which are mounted two feeding elements 20a and 20b. These feeding elements are any of the conventional feeding elements readily available in the prior art for receiving and exhausting particulate welding material, such as the well-known feed wheel elements. A hopper 21 for welding material is connected to each feeding element. Also each feeding element 21a and 21b has connected to it its own motor, 22a and 22b respectively, with separate controls 28a and 28b for each motor. Since these controls are independent of each other, they can be set to produce and maintain feeds in desired proportions resulting in a uniform alloy. The possible proportions are virtually infinite.

Typically the feeding element's speed can be adjusted between a range of 2 and 32 revolutions per minute.

Feed tubes 24a and 24b serve to conduct the weld material from their corresponding feed elements to the tube 26 which feeds into the powder distributor 27. The powder distributor 27 serves the function of mixing and directing the powder to the weld zone.

If desired, a sub-arc flux hopper 40 can be provided for holding the flux 44 to be conducted through tube 42 to the weld zone. This flux 44 shields the molten metal from the air preventing oxidation and removes impurities.

The wire electrode 32 is fed from the welding wire holder 34 to the weld zone 82 by the wire feed 30 which is mounted on the body member 12 independently of the feed elements 20. The wire feed 30 operates independently of the motors 22 so that the feed elements 20 can be driven at speeds different from that of the wire feed 30.

The weld puddle 86 is formed by the cascade 80 of the welding materials 23a and 23b, the flux 44, and the wire electrode 32. The finished weld is represented by the area designated by numeral 84.

The multiple material feeder apparatus according to the present invention precludes the necessity for designing, making, using, and replacing a large multiplicity of different feed wheels. By using the present invention when a particular deposition rate or a particular ratio of material to electrode is desired, a precise setting can be easily made on the controls for the feeding elements, without having to change feed wheels.

The multiple feeder of the present invention may be used in any type of fusion welding or weld overlaying and in open arc, series arc, submerged and shielded welding and the like.

The present invention, therefore, is well suited and adapted to attain the objects and ends and has the advantage and features mentioned as well as others inherent therein. While presently-preferred embodiments of the invention have been given for the purpose of disclosure, changes may be made therein which are within the spirit of the invention as defined by the scope of the appended claims.

What is claimed is:

1. A multiple feeder for use in welding comprising:
 a body member,
 a plurality of feeding elements mounted to the body member for feeding independently of each other particulate weld material into discharge means for transmission to a weld zone,
 the discharge means mounted to the body member above the weld zone, the discharge means provided with a generally central passage and a chamber about the passage for receiving and discharging the weld material,
 electrode feeding means mounted to the body member for directing an electrode to the weld zone,
 electrode drive means for moving the electrode to the weld zone,
 means for transmitting the particulate weld material from the feeding elements to the discharge means,
 each of the feeding elements having connected thereto its own drive means independent of each other element's drive means and independent of the electrode drive means, and
 each feeding element having controllingly connected thereto its own independent control means so that the proportions of the materials fed can be independently, continuously, and accurately controlled and set as desired.

2. The feeder of claim 1 wherein the particulate weld material includes material which produces a shielding gas about the weld zone.

3. The feeder of claim 1 including also means for producing a gas shield about the weld zone.

4. The feeder of claim 1 including also powder distributor means mounted to the discharge means for facilitating the mixing and directing of weld material.

5. The feeder of claim 1 including also means mounted to the body member for feeding flux to the weld zone.

* * * * *